Dec. 1, 1964 B. J. LAZAN 3,159,249
DAMPING MEANS
Filed Jan. 27, 1960 3 Sheets-Sheet 1
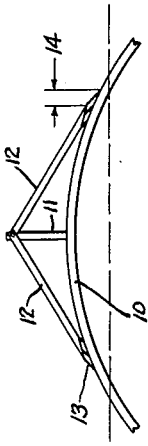
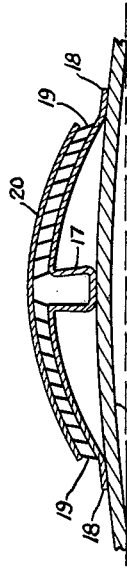
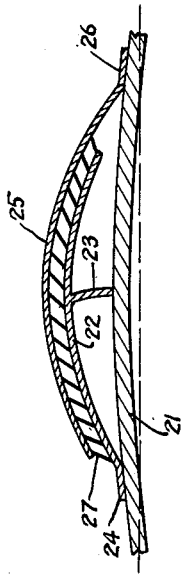
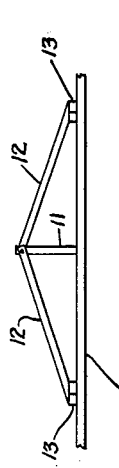
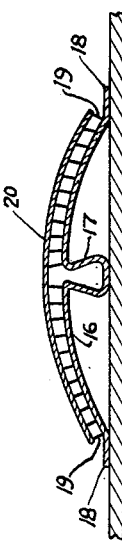
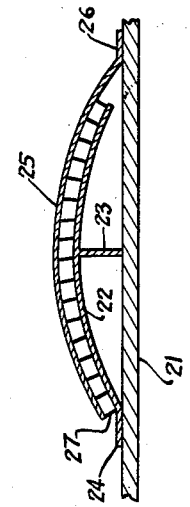
INVENTOR.
BENJAMIN J. LAZAN
BY Moore, White & Burd
ATTORNEYS Dec. 1, 1964  B. J. LAZAN  3,159,249
DAMPING MEANS
Filed Jan. 27, 1960  3 Sheets-Sheet 2
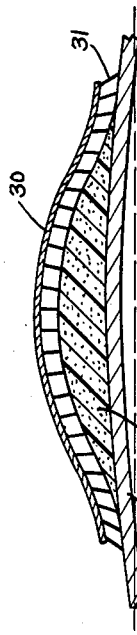
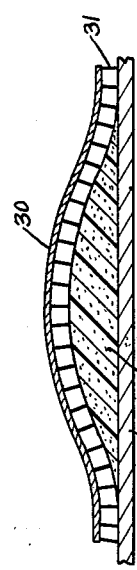
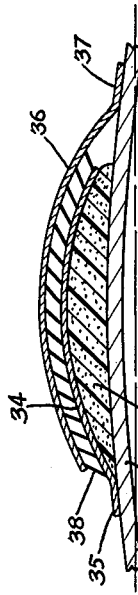
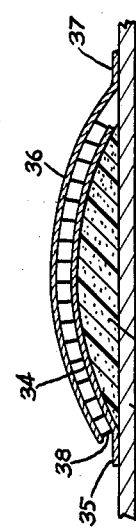
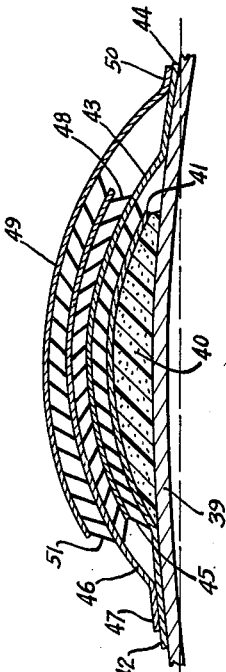
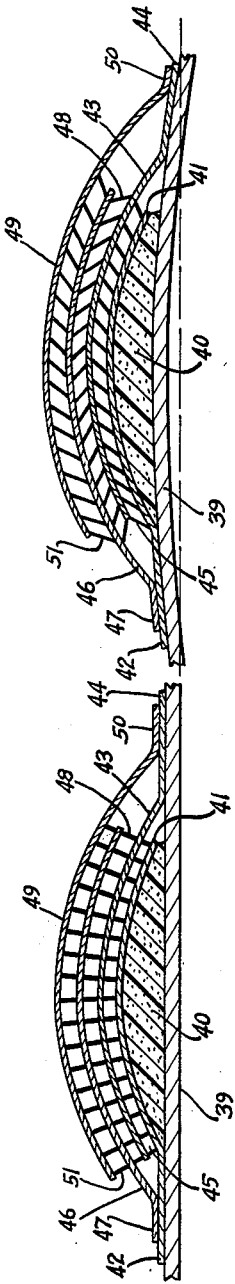
INVENTOR.
BENJAMIN J. LAZAN
BY
Moore White & Burd
ATTORNEYS Dec. 1, 1964   B. J. LAZAN   3,159,249
DAMPING MEANS
Filed Jan. 27, 1960   3 Sheets-Sheet 3

INVENTOR.
BENJAMIN J. LAZAN
BY
*Moore, White & Purd*
ATTORNEYS

United States Patent Office 3,159,249
Patented Dec. 1, 1964

3,159,249
DAMPING MEANS
Benjamin J. Lazan, St. Paul, Minn., assignor to The Regents of the University of Minnesota, Minneapolis, Minn., a corporation of Minnesota
Filed Jan. 27, 1960, Ser. No. 5,051
8 Claims. (Cl. 189—34)

This invention relates to damping means for the reduction of amplitude of vibration of beams, plates, panels, shells and like structural members subjected to uniaxial and biaxial bending, in the treatment of mechanical and acoustic vibration and fatigue problems. More particularly, this invention relates to corrugated configurations for increasing damping and stiffness in bending.

In many types of acoustic vibration and fatigue problems, periodic or random vibrations near resonance are involved and thus the mechanical damping energy dissipated within the beam or panel configuration becomes important. An associated problem in that of increasing the stiffness of panels and shells, particularly where elastic and plastic instabilities may be involved. Efforts have been made in recent years to utilize the damping potential offered by various types of interface effects. Shear hysteretic damping in a viscoelastic adhesive layer located at the interface between rigid members has proved of interest. An adhesive interface is capable of dissipating very large energies for properly designed configurations. It has been established that viscoelastic adhesives, if properly used, can add very large damping to a configuration.

The use of adhesive interfaces to increase damping and stiffness may be involved in two types of problems. In an entirely new design a configuration may often be optimized to dissipate large damping energy through proper proportioning of both the member and its means of support. In a second type of problem one may not have the freedom to redesign an entire structural component and its joints, yet there is often room to add a surface treatment to increase the damping and stiffness of the members. Examples of this "surface addition" approach are damping coatings, damping tapes, spacing layers, sandwich additions and other types of layered construction. Although the present invention relates primarily to corrugated surface additions, the principles involved are equally applicable to design optimization, including the design of new types of sandwich constructions.

The principal object of this invention is the provision of improved means for increasing the damping and stiffness of members subjected to uniaxial or biaxial bending.

Another object of this invention is to provide corrugated configuration additions for increasing damping and stiffness in bending.

A still further object of this invention is to provide corrugated configured structures of increased damping capability and increased stiffness.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

FIGURE 1 is a simplified and purely schematic configuration illustrating one manner in which local lateral deflection associated with curvature can be transformed into adhesive shear;

FIGURE 2 shows the same schematic configuration subjected to deflection;

FIGURE 3 is a truss or corrugation configuration, shown in section, adapted for converting bending curvature to shear in an adhesive layer;

FIGURE 4 shows the configuration of FIGURE 3 subjected to deflection;

FIGURE 5 is a corrugated configuration, in section, which converts bending curvature to reasonably uniform shear of the same sign along an adhesive layer;

FIGURE 6 shows the configuration of FIGURE 5 subjected to deflection;

FIGURE 7 is a simple corrugated configuration, shown in section, composed of a tape or sheet secured to a filler or core by means of a viscoelastic adhesive layer;

FIGURE 8 shows the configuration of FIGURE 7 subjected to deflection;

FIGURE 9 is a filled corrugated configuration addition, shown in section, composed of overlapped corrugations held by a viscoelastic adhesive layer;

FIGURE 10 shows the configuration of FIGURE 9 under deflection;

FIGURE 11 is an overlapped filled corrugated configuration addition, shown in section, utilizing multiple overlaps;

FIGURE 12 shows the configuration of FIGURE 11 under deflection;

Figure 13:
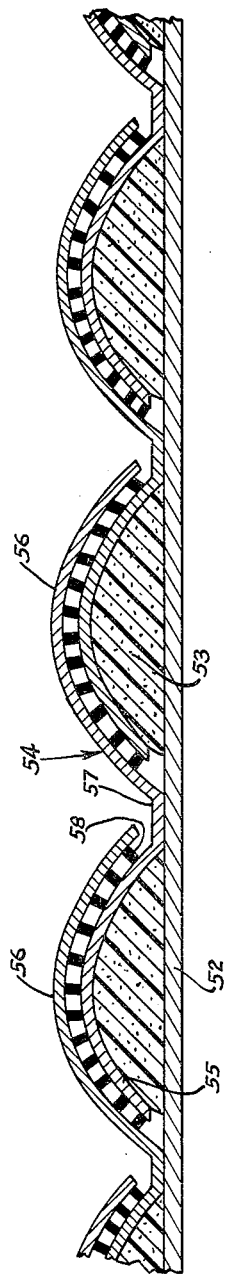
FIGURE 13 is one form of a multiple wave corrugation configuration, shown in section.

It has been known that the damping of a panel may be increased by adding a thick layer of viscoelastic or similar material to the panel. As the panel is subjected to cyclic bending deflections, cyclic direct strain (tension-compression) is developed in the viscoelastic layer. Although reasonably satisfactory in some types of panel noise problems, this means for increasing damping is generally ineffective since it utilizes only a small percentage of the maximum damping energy which the viscoelastic layer is capable of dissipating.

An improved approach involves the addition of sound damping tape or sheet material consisting of a thin layer of viscoelastic adhesive and a backing, usually formed from aluminum foil or some other metal. U.S. Patent No. 2,819,032 issued to Detrie et al. is exemplary of this damping material. The mechanism of energy dissipation in this case is one of shear in the viscoelastic layer. As the beam or panel flexes, the viscoelastic layer located well above the neutral axis and restrained by the backing tape or sheet receives a cyclic shear and thus dissipates energy. However, for most thin beams or panels the distance between the neutral axis of bending and the plane of the viscoelastic adhesive is so small that the cyclic shear strain imposed on the adhesive is well below its limits and thus the energy dissipation is also well below the limits in the materials.

It has been suggested that this deficiency be overcome by locating the viscoelastic layer further from the neutral axis by means of a spacing layer to increase the cyclic shear associated with any given cyclic flexing. Theoretically, the damping energy which can be dissipated by the adhesive shear mechanism can be greatly increased by such a spacing layer. However, there are practical difficulties which limit the use of this alternative. In order to be effective, the spacing layer must be reasonably thick. Furthermore, most applications require a low density material to avoid excessive weight and cost. Unfortunately, most low density spacing layers or core materials have relatively low shear modulus so that much of the cyclic shear which would otherwise be transmitted to the viscoelastic adhesive may be lost as shear strain in the core material. Thus, the adhesive is subjected to a relatively small cyclic shear and the full potential of the viscoelastic adhesive is again not realized. A spacing layer can also be used to increase the distance between a damping layer composed of a viscoelastic coating and the neutral axis of bending. However, this too is subject to the same difficulty that much of the available shear strain will be absorbed by the spacer.

The present invention is directed toward overcoming the limitations of the prior art by the use of a corrugated addition. By means of the corrugated structure cyclic shear strain in the viscoelastic material can be adjusted to any desired value by design. The full damping potential of the viscoelastic adhesive within its fatigue limits can be realized. Whenever local bending stresses are present, the member subjected to the stresses will assume a local radius of curvature dependent on the stresses. For beams this is a one dimensional curvature. For plates and panels it is a two dimensional curvature. The deflection associated with this local curvature is generally much larger than the total surface strain (or shear strain in the adhesive in the conventional damping tape). The function of the corrugation configuration is to convert such large lateral deflections to a shear in an appropriately placed adhesive.

The basic principles involved in transforming local lateral deflection associated with curvature into adhesive shear are illustrated by the simplified and purely schematic configurations shown in FIGURES 1 and 2. The configurations include a horizontal beam 10 to which is attached a vertical upright 11. Pinned to the top of the vertical upright are two diagonal members 12 which contact the beam 10 through a viscoelastic layer or adhesive 13. This structure deflected is shown in FIGURE 2.

When the beam is deflected, the adhesive layer 13 is subjected to total shear as represented at 14. As the beam vibrates through the next half cycle producing a downward deflection, the adhesive layers will be subjected to the same shear of opposite sign. It can be observed that the shear value is of substantial magnitude due to the local lateral deflection associated with the curvature of the beam representing a single corrugation. For thin members which are of greatest interest in acoustical vibration, the shear values are generally much larger than the shear in a damping tape addition according to prior practice. Where necessary, additional interfaces may be added in corrugation configurations in order to further increase the shear area for maximum damping.

In FIGURES 3 and 4 there is shown a structure for utilizing a truss or corrugation configuration for converting bending curvature to shear in a viscoelastic adhesive layer. Beam 15 supports a corrugated member 16 having a central channel 17 and a pair of flanges 18. The corrugated member is attached to the beam at three points, at the bottom of the channel 17 and at both flanges 18. Layers of viscoelastic adhesive material 19 separate a cover plate 20 from the member 16 while securing them together. The shear strain introduced by deflection of the beam 15 can be observed by comparison of FIGURES 3 and 4. In this configuration the shear strain on opposite sides of the corrugation channel is of opposite sign. Structure having identical cross section may be utilized to damp panels subjected to uniaxial bending, as well as beams, merely by elongating the corrugated structure.

A corrugated configuration which produces reasonably uniform shear of the same sign along the viscoelastic adhesive layer is shown in FIGURES 5 and 6. Beam 21 supports an inner corrugated member 22 having a central T support 23 and a flange 24 at one side. The inner corrugated member is attached to the beam at two places by the T support and flange 24. A similar outer corrugated member 25 having a flange 26 at one side is positioned over the inner corrugated member spaced from and secured thereto by means of a viscoelastic layer 27. The upper corrugated member 25 is attached to the beam at flange 26. Thus, the composite corrugated configuration is attached to the beam at three points. The shear strain introduced by deflection of the beam can be seen by comparison of FIGURES 5 and 6. Corrugated configurations having identical cross section may be used for damping panels subject to uniaxial bending merely by using elongated corrugated members.

Possible difficulties which might result from local buckling, instabilities, or other strains in the thin corrugated members of the configurations of FIGURES 3 to 6, which might seriously reduce the adhesive shear corresponding to a given deflection and thus prevent the realizing of the damping potential of the corrugation, are overcome in the simple corrugation shown in FIGURES 7 and 8. Beam 28 supports a corrugated filler 29 on top of which is applied a tape or sheet 30 secured to the filler by a layer of viscoelastic adhesive 31. The filler or core material 29 is a rigid lightweight material, such as balsa wood or the like, or an artificial rigid cellular material, such as plastic foam, such as polyurethane and polystyrene. Comparing this structure with that of FIGURES 3 and 4, the filler or core 29 serves the same general function of providing the truss action required to convert curvature to shear as performed by the corrugated member 16 while at the same time the tape or sheet 30 serves as a restraining member for developing shear strain in the adhesive layer in the same manner as the cover plate 20. The action of this corrugated configuration is revealed by comparison of FIGURES 7 and 8.

While lightweight spacer materials are generally unsatisfactory as a spacing layer for damping tape used in the conventional manner because of their low shear modulus, the low shear modulus is no longer a deterrent when the spacer materials are used as a corrugation filler as shown in FIGURES 7 and 8. The main property required in the corrugation fillers is a relatively high bulk modulus only since the filler or core is reasonably confined around its entire periphery. In general the bulk modulus of foam and other similar core materials is sufficiently high to serve its function in the corrugation configuration whereas the shear modulus is generally much too low to serve as an effective spacing layer in conventional tape applications. The corrugated configuration of FIGURES 7 and 8 may likewise be utilized for damping panels against flexing and the configuration for that purpose would have identical cross section.

In FIGURES 9 and 10 there is shown a filled overlapped corrugated configuration. Beam 32 supports a filler or core 33 having a corrugated outer surface. An inner corrugated member 34 having a flange 35 along one side is supported by the beam and the core. An overlapping outer corrugated member 36 having a flange 37 along the opposite side overlies the corrugated member 34 being spaced therefrom and secured thereto by means of a viscoelastic layer 38. The outer corrugated member is attached to the beam at flange 37. The effect of deflection of the beam upon the viscoelastic layer is shown by comparison of FIGURES 9 and 10. An advantage of this overlapped configuration is that the maximum shear strain is doubled and unit damping energy is four times as large as compared with the configuration of FIGURES 7 and 8. Furthermore, the shear strain is uniformly distributed. The corrugated configuration of FIGURES 9 and 10 may likewise be utilized for the damping of panels by means of an elongated structure of identical cross section.

A corrugated configuration utilizing multiple overlaps for accomplishing still higher damping is shown in FIGURES 11 and 12. Beam 39 supports a lightweight filler or core 40 having a corrugated surface which in turn supports a first innermost corrugated member 41 having a flange 42 along one side. A second corrugated member 43 having a flange 44 on the opposite side overlaps the first corrugated member 41 being spaced therefrom and secured thereto by means of a viscoelastic adhesive layer 45. Corrugated members 41 and 43 are attached to the beam by their respective flanges 42 and 44. A third corrugated member 46 having a flange along one side is disposed to overlap the second corrugated member 43 being spaced therefrom and secured thereto by means of another viscoelastic adhesive layer 48. A fourth and outermost corrugated member 49 having a flange 50 along one side is disposed to overlap corrugated member 46 spaced therefrom and attached thereto by means of a third viscoelastic adhesive layer 51.

The great shear strain developed in the viscoelastic layers upon deflection of the beam is apparent from comparison of FIGURES 11 and 12. It is seen that a large volume of interface adhesive under high shear may be incorporated in such a design thus producing large damping. This configuration accomplishes the desired aims more effectively than the same volume of viscoelastic material in fewer but thicker layers of adhesive by minimizing the effect of heat and temperature increase associated with damping and the effect of low unit shear strain in the adhesive. An elongated corrugated configuration having identical cross section to that shown in FIGURES 11 and 12 may obviously be employed for damping panels. Even greater damping may be accomplished with the configurations of FIGURES 9 through 12 by interposing a layer of viscoelastic material between the curved surface of the filler member and the innermost corrugation member in each instance.

It is apparent that the corrugated configuration structures offer a high degree of design flexibility for building into a structure the desired magnitude of damping. Design parameters which can be adjusted to meet the required properties are the wave length of the corrugation and wave length height (to adjust the total shear strain to the desired value), thickness of adhesive (to adjust the unit shear strain and unit damping to the desired value consistent with problems associated with temperature increase), and length, width and number of interfaces (to adjust adhesive volume to produce desired total damping for given unit damping).

In general, the wave length of the corrugation will be substantially less than the length of the beam. For this reason, several corrugations are usually necessary. One manner of building up a multiple wave corrugation is shown in FIGURE 13. Beam 52 supports a plurality of fillers or cores 53 having curved outer surfaces. A double corrugated member indicated generally at 54 is disposed over adjacent pairs of filler elements. Each double corrugated member 54 includes an inner corrugation 55 and an outer corrugation 56 of somewhat greater radius of curvature joined on opposite sides of a central valley or trough 57 which is attached to the beam. The inner corrugation 55 of each double corrugated member 54 is supported by a filler element 53. The outer corrugation 56 of each double corrugated member 54 overlaps the inner corrugation 55 of the next adjacent double corrugated member. The inner and outer corrugations are spaced apart and attached together by means of a layer of viscoelastic adhesive material 58. It will be seen that the damping action of this configuration is generally the same as that of the configuration shown in FIGURES 9 and 10. In order to force maximum curvature within the corrugation wave length, the configuration may be stiffened in the region of the valley or trough 57 by using strips of multiple wave corrugations which are staggered so that the peak or crest at the top of outer corrugation 56 of one row of corrugations will be aligned with the valley or trough 57 of the adjacent rows.

Figure 14:
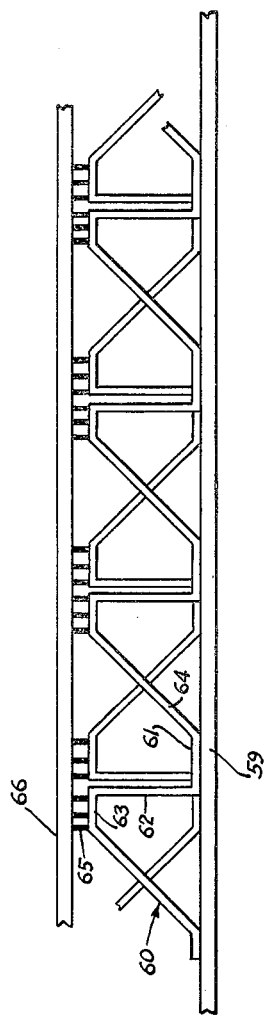
FIGURE 14 is a modified form of multiple wave corrugation configuration, shown partly in section.

A further multiple wave corrugation structure is shown in FIGURE 14. Beam 59 supports a multiple corrugated member indicated generally at 60 and comprised of a series of flat lower horizontal portions 61, vertical portions 62, upper horizontal portions 63 and diagonal portions 64. The continuous multiple corrugation is attached to the beam at each of its valleys or grooves as represented by the lower horizontal portions 61. A layer of viscoelastic adhesive material 65 is applied to the top of each of the ridges of the continuous corrugation 60 and a cover skin 66 is applied over the viscoelastic layer. Alternate corrugation strips are laid in opposite direction to provide the truss required to convert bending deflection to shear.

Although the corrugation configuration additions have been described primarily in connection with beams or panels which are subjected to unidirectional bending only, it is understood that in most acoustic problems plates, panels and shells involving biaxial bending are of primary importance. One method of increasing the damping of these types of members has been considered, that of using elongated longitudinal corrugations. Another discussed in connection with the structures of FIGURES 13 and 14 is the use of corrugated strips attached in staggered relation. Corrugated strips, such as the strips 60 of FIGURE 14, may be attached to a panel in cross woven pattern. A series of corrugated strips, identical to those shown, disposed perpendicular to the plane of the figure are woven through the network of strips shown. Alternatively, separate strips may be laid in an alternating pattern to orient the corrugations in mutually perpendicular directions in simulation of a basket-weave pattern, but not actually cross woven. The principle of corrugation damping may also be adapted to biaxial bending by utilizing circular dish-shaped attachments having cross sections similar to those of FIGURES 3, 4, 7 and 8. For example, utilizing a structure as shown in FIGURE 7 a circular-shaped addition having the cross section shown on any diameter would provide damping under either uniaxial or biaxial bending.

The foregoing discussion has been concerned primarily with methods for increasing damping by utilizing hysteretic effects associated with cyclic shear strain in an adhesive in a corrugation configuration. If high damping (large strain energy dissipation) is the sole objective, then in selecting an adhesive high loss modulus and large permissible cyclic shear should be emphasized. Furthermore, the value of storage modulus (or absolute modulus of rigidity) should be as low as possible to minimize the strain energy storage in the adhesive at maximum deflection and thus minimize the resonance amplification. Thus, for high damping and low resonance amplification a large ratio is desirable for loss modulus to storage modulus (often called loss angle) and thus "soft" viscoelastic type of adhesives are preferred.

Often, however, large stiffness is desired in a panel even at the expense of high damping and low resonance amplification. In such cases, a large value for storage modulus (or absolute modulus of rigidity) characteristic of structural adhesives is preferred. For high temperature applications beyond the temperature limits of adhesives, welded or brazed interfaces offer possible solutions (very high storage modulus).

By utilizing the corrugation configuration additions according to the present invention, either high damping or large stiffness or the desired combination of the two can be designed into the same basic configuration by the appropriate choice of adhesive material and adhesive thickness. Since a wide range of viscoelastic adhesives are available ranging from very soft pressure sensitive materials to very hard structural adhesives, the present invention offers a design flexibility which permits choosing the desired combination of damping and stiffness best for any given application.

The effectiveness of the present invention for damping and increasing stiffness is not dependent upon the use of any particular viscoelastic material, but upon the corrugation configuration. Virtually any of the vast number of viscoelastic materials commercially available may be utilized in the practice of the invention. For the most part, these are natural and synthetic rubber and rubber-like resinous materials compounded with various solvents, plasticizers, fillers, curing agents and the like. Although the materials utilized in the practice of the present invention are desirably pressure sensitive, being permanently soft and permanently tacky, this is primarily for convenience of application. For some installations, solvent sensitive and heat sensitive viscoelastic adhesive materials may be utilized. The primary physical characteristic of the viscoelastic material is that it be subject to substantial internal working when yieldably deformed.

Any of the commercially available pressure sensitive tapes may be utilized. The backing of such a tape should be a sheet material having substantial strength and stiffness in compression and tension, but substantially no resistance to bending. Metallic foil or other thin gauge metal sheeting, such as aluminum, stainless steel and the like, are exemplary. Typical pressure sensitive adhesives include polymerized isobutylene, copolymers of isobutylene and butadiene and the like. Reference may be had to U.S. Patent No. 2,551,600 as exemplary of adhesives suitable for use on pressure sensitive adhesive tapes subjected to a wide variety of climatic conditions and high temperatures encountered in numerous industrial operations.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A corrugation configuration damping structure for attachment to structural members subjected to bending to increase the damping and stiffness thereof, which structure comprises a corrugated element, the ridge of said corrugated element being adapted to be spaced away from the surface of said structural member, means for attaching said corrugated element to at least one surface of said structural member, rigid supporting means positioned between said ridge and structural member surface, said supporting means being a lightweight rigid cellular material disposed between said corrugation ridge and structural member surface, a layer of viscoelastic material overlying the ridge of said corrugated element and a restraining cover layer of flexible sheet material overlying said viscoelastic layer.

2. A damping structure according to claim 1 further characterized in that the curvature of said corrugated element is uniaxial.

3. A damping structure according to claim 1 further characterized in that said corrugated element is an arcuate metallic sheet.

4. A damping structure according to claim 1 further characterized in that said rigid cellular material is a synthetic resinous foam.

5. A damping structure according to claim 1 further characterized in that said restraining cover layer is a flexible metallic sheet.

6. A damping structure according to claim 1 further characterized in that said viscoelastic material is a pressure sensitive adhesive.

7. A damping structure according to claim 1 further characterized in that said corrugated element is a multiple wave corrugation comprised of a plurality of ridges.

8. A corrugation configuration damping structure for attachment to structural members subjected to bending to increase the damping and stiffness thereof, which structure comprises a metallic sheet corrugated element, the ridge of said corrugated element being adapted to be spaced away from the surface of said structural member, rigid supporting means positioned between said ridge and structural member surface, a layer of viscoelastic material overlying the ridge of said corrugated element and a restraining cover layer of flexible metallic sheet material overlying said viscoelastic layer, said corrugated element and restraining cover layer forming a compound element composed of a plurality of overlapped arcuate metallic sheets, said sheets having means for attachment to said structural members on opposite sides of adjacent metallic sheets, said viscoelastic material being disposed between each adjacent pair of overlapped metallic sheets.

References Cited in the file of this patent

UNITED STATES PATENTS

| 1,499,557 | Shodin | July 1, 1924 |
| 1,759,722 | Watson | May 20, 1930 |
| 1,919,484 | Saurer | July 25, 1933 |
| 1,924,504 | Lee | Aug. 29, 1933 |
| 2,322,193 | Kaemmerling | June 15, 1943 |
| 2,551,600 | Holland et al. | May 8, 1951 |
| 2,819,032 | Detrie et al. | Jan. 7, 1958 |

FOREIGN PATENTS

| 487,346 | Great Britain | June 20, 1938 |
| 513,171 | Great Britain | Oct. 5, 1939 |
| 898,053 | France | June 26, 1944 |